(12) United States Patent
Van Dyke et al.

(10) Patent No.: US 10,641,552 B2
(45) Date of Patent: May 5, 2020

(54) HEAT-RECOVERING TEMPERATURE-GRADIENT BASED OVEN SYSTEM

(71) Applicant: Tesla Motors, Inc., Palo Alto, CA (US)

(72) Inventors: Christopher Gandhi Van Dyke, San Francisco, CA (US); Turner Boris Caldwell, San Francisco, CA (US)

(73) Assignee: Tesla, Inc., Palo Alto, CA (US)

( * ) Notice: Subject to any disclaimer, the term of this patent is extended or adjusted under 35 U.S.C. 154(b) by 420 days.

(21) Appl. No.: 15/382,451

(22) Filed: Dec. 16, 2016

(65) Prior Publication Data

US 2017/0184345 A1 Jun. 29, 2017

Related U.S. Application Data

(60) Provisional application No. 62/387,244, filed on Dec. 23, 2015.

(51) Int. Cl.
*F27B 9/30* (2006.01)
*F27D 17/00* (2006.01)

(52) U.S. Cl.
CPC .......... *F27B 9/3044* (2013.01); *F27B 9/3005* (2013.01); *F27D 17/004* (2013.01);
(Continued)

(58) Field of Classification Search
CPC .............. F27B 9/3044; F27B 2009/305; Y02P 10/265; Y02P 20/12
(Continued)

(56) References Cited

U.S. PATENT DOCUMENTS 3,144,243 A * 8/1964 Henson .................. C21D 1/767
432/152
3,631,819 A 1/1972 Houchman
(Continued)

FOREIGN PATENT DOCUMENTS

EP 0878681 A2 11/1998
JP 2011196654 A 10/2011

OTHER PUBLICATIONS

International Searching Authority; International Search Report and Written Opinion; International Application No. PCT/US2016/067435; dated Feb. 17, 2017; 11 pgs.
(Continued)

*Primary Examiner* — Grant Moubry
*Assistant Examiner* — Rabeeul I Zuberi
(74) *Attorney, Agent, or Firm* — Knobbe, Martens, Olson & Bear, LLP

(57) ABSTRACT

A heat-recovering oven system based on temperature gradient comprises: multiple chambers arranged in a sequence, the chambers configured for operating at various temperatures according to a temperature gradient arrangement that spans the sequence; a conveyor configured for transporting product through the multiple chambers in the sequence for heat treatment according to the temperature gradient arrangement; and multiple temperature-segregated heat exchanger systems, each heat exchanger system including a heat exchanger, a conduit to at least one of the chambers based on its temperature in the temperature gradient arrangement, and a return conduit from the at least one chamber to the heat exchanger.

20 Claims, 4 Drawing Sheets

(52) U.S. Cl.
CPC .. *F27B 2009/305* (2013.01); *F27D 2017/007* (2013.01); *Y02P 10/265* (2015.11); *Y02P 20/124* (2015.11)

(58) Field of Classification Search
USPC .......................... 432/128–133; 219/393–395
See application file for complete search history.

(56) References Cited

U.S. PATENT DOCUMENTS

| | | | |
|---|---|---|---|
| 4,646,447 A | | 3/1987 | Aznavorian |
| 4,711,164 A | | 12/1987 | Mendoza |
| 5,046,946 A | * | 9/1991 | Yasuda ................. F27B 9/3011 264/631 |
| 5,613,847 A | * | 3/1997 | Lingl .................... F27B 9/3005 432/133 |
| 6,369,360 B1 | | 4/2002 | Cook |
| 2003/0051723 A1 | | 3/2003 | Gunawardena et al. |
| 2013/0277896 A1 | | 10/2013 | Buchet et al. |

OTHER PUBLICATIONS

European Patent Office; Extended European Search Report; EP Application No. 16879919.5; dated May 31, 2019; 12 pgs.

\* cited by examiner

HEAT-RECOVERING TEMPERATURE-GRADIENT BASED OVEN SYSTEM

CROSS-REFERENCE TO RELATED APPLICATION

The present U.S. Utility patent application claims priority pursuant to 35 U.S.C. § 119(e) to U.S. Provisional Application No. 62/387,244, entitled "HEAT-RECOVERING TEMPERATURE-GRADIENT BASED OVEN SYSTEM", filed 23 Dec. 2015, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE DISCLOSURE

Ovens are used in many industrial processes of various types. One common use of an oven is for heat treatment of materials, such as the evaporation of water or a solvent from a manufactured component. The air in the oven is heated by a heater to convey thermal energy to the material. To remove evaporated water or solvent the air can be circulated into and out of the oven. This circulation can also provide an opportunity to add heat to the air in the oven, as energy is inherently lost in the thermal treatment. However, the circulation can also be a source of energy loss, for example when heated air is released into the ambient environment. To counter this heat loss, heat exchangers have been used in an effort to recuperate some of the energy that would otherwise be lost.

Historically, thermal processes of an industrial scale have often been powered by fossil fuels, which were relatively inexpensive. Until now it has therefore not been a significant priority to reduce thermal losses in industrial oven processes. However, modern factories are often designed to rely less on fossil fuels or to eliminate them entirely, instead using renewable energy sources, which may be costlier in the short term. Energy efficient industrial process will therefore become much more important.

DETAILED DESCRIPTION OF THE DRAWINGS

This document describes examples of systems and techniques for providing energy efficient thermal processes on an industrial scale. In some implementations, an oven system is designed for more efficient use of heat exchangers in the delivery of thermal energy into the oven system. For example, when multiple heat exchangers are used, ovens that operate at different temperatures are grouped to different heat exchangers to allow them to operate more efficiently. As a result, loss of thermal energy is reduced.

Figure 1:
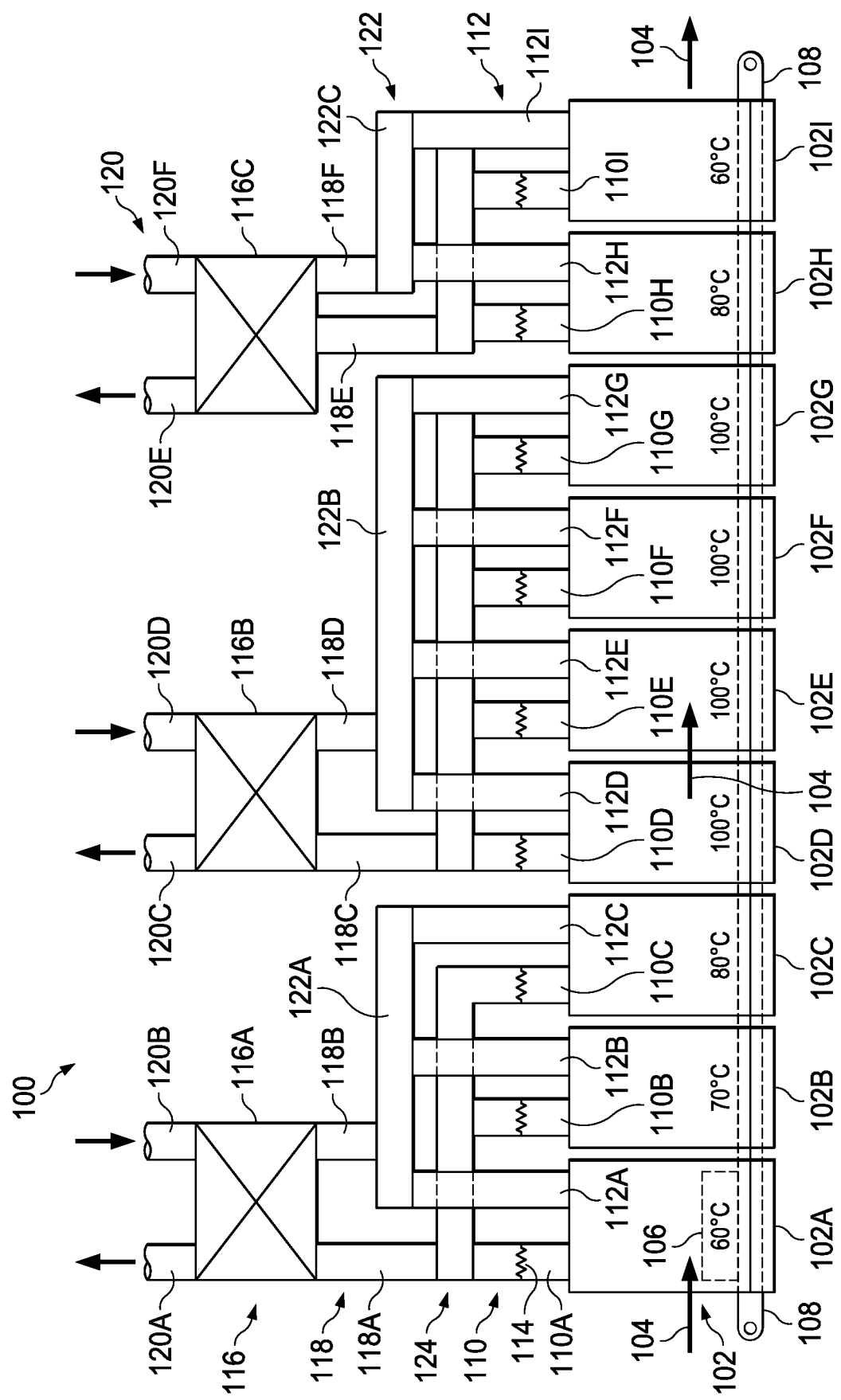
FIG. 1 is a block diagram illustrating a heat-recovering oven system constructed according to one or more embodiments of the present disclosure.

FIG. 1 is a block diagram illustrating a heat-recovering oven system 100 (referred to herein interchangeably as an "oven system") constructed according to one or more embodiments of the present disclosure. The oven system 100 includes a number of chambers 102A to 102I that are configured for use in a thermal treatment process. The chambers are arranged in a sequence beginning with the chamber 102A and in this example ending with the chamber 102I. The sequence can have any configuration. In some implementations, the sequence is essentially linear. In some implementations, the sequence can have an essentially arcuate or other curved shape. For example, the chambers can be arranged in an arc having its ends at the chambers 102A and 102I, respectively, with the remaining chambers offset in some direction (e.g., upwards or downwards) relative thereto.

A passageway 104 is defined through the set of chambers. In some implementations, each chamber 102A-120I includes a cavity for the heated air which is defined by walls of the chamber 102A-102I. In particular, some of the side walls can have openings that allow the material being heat treated to be passed from one chamber to the next. Such openings can be essentially similar from one chamber to the next. For example, the entire passageway 104 can at least in part be defined by such chambers 102A-102I and respective inter-chamber openings so as to provide a longitudinal path through the set of chambers.

The oven system 100 can be designed for heat treatment of a wide variety of materials. In some implementations, solid or liquid materials, or combinations thereof, can be routed through the chambers 102A-102I in the process. For example, the oven system 100 can be used for drying materials evaporating water and/or another solvent.

The material subject to heat treatment can have a variety of shapes, or no permanent shape, as in the case of a liquid. Here, a product 106 is schematically illustrated inside the chamber 102A. In some implementations, the product 106 can have other configurations and/or dimensions. The product 106 can be enclosed in a suitable material or can be uncovered for direct exposure to the oven air.

A conveyor or other transport system can be provided for some or all of the oven system. Here, a conveyor belt 108 is arranged along the sequence of the chambers 102A-102I from end to end. The product 106 is placed on the conveyor belt 108, which allows the system 100 to transfer the product 106 from chamber to chamber in the process. In this example, it is assumed that the product 106 is transported through the chambers 102A-102I in an essentially linear sequence, and that the direction of travel is from the chamber 102A toward the chamber 102I. However, other configurations of the transport/movement of product 106 can be used.

The heat treatment involves heating at least one of the chambers to a different temperature than the temperature of another chamber, at least for part of the process. The temperatures can depend on the particular product 106 being treated and/or the type of heat treatment being performed. Solely for illustrative purposes, approximate temperatures have been indicated for the respective chambers in this example. Here, chambers 102A and 102I are labeled with 60° C.; chamber 102B is labeled with 70° C., chambers 102C and H are labeled with 80° C.; and chambers 102D-G are labeled with 100° C. As such, this is an example of chambers in an arrangement that involves a temperature gradient throughout the sequence of the heat treatment process. Various temperature gradient arrangements can be used in different implementations. For example, here the temperature gradient arrangement involves increasing the temperature at the beginning of the transport route, then plateauing the temperature over some distance intermediate the beginning and end, and finally decreasing the temperature as the product nears the end of the linear sequence. As such, the temperature gradient arrangement can include increasing temperatures from a beginning of the sequence, and decreasing temperatures toward an end of the sequence. In other implementations, the temperature gradient arrangement can involve more than one local temperature maximum, and or more local temperature minima, or combinations thereof.

Air is mentioned as a heat transfer medium in examples described herein. In other implementations, however, any other fluid can be used, such as another gas or a liquid. For example, the chambers can be configured for liquid-based heat treatment of a material in the thermal process.

Air can be supplied to some or all of the chambers. Here, conduits 110 provide incoming air that can serve as one, or the single, source of energy for the respective chamber. Similarly, air is removed from the chambers by respective return conduits 112. For example, the chamber 102A receives air through the conduit 110A and has air removed through return conduit 112A. Each conduit and the corresponding return conduit can be similar to each other, or can have some difference, for example to accommodate a change in the air that takes place in the chamber (e.g., due to evaporation). Any type(s) of conduit can be used, including, but not limited to, ducts made of a material suitable for the levels of flow and temperature that are involved in the thermal treatment process.

One or more heaters can be provided in the oven system 100. In some implementations, each of the conduits 110 that provide incoming air is provided with a respective heater 114. For example, this can be an electric heater 114. The electric heater 114 can be used for increasing the temperature of air in the conduit 110 before it enters the respective chamber 102. As such, the heater 114 in the conduit 110A can be controlled to provide air of 60° C. into the chamber 102A, while a corresponding heater in the conduit 110B is controlled to provide air of 70° C. into the chamber 102B, to name just two examples. Each heater 114 is controlled to regulate the amount of heat it delivers, if any. For example, a central controller can regulate the heaters 114 either collectively or individually. The heaters 114 can be of the same type or two or more heater types can be used (e.g., a more powerful heater for chambers that should have a higher temperature).

The oven system 100 can include multiple heat exchangers 116. For example, here three heat exchangers 116A-C are used, each dedicated to a particular temperature, or temperatures, of chambers, as will be explained. Any type of heat exchanger 116 can be used that is suitable for the thermal process being performed and that is compatible with the type of heat treatment. For example, an air-to-air heat exchanger can be used. Each of the heat exchangers has ports 118 on one side thereof (e.g., toward the chambers) and other ports 120 on another side thereof (e.g., away from the chambers). For example, on the heat exchanger 116A a port 118A is the outlet from the heat exchanger 116A towards the chambers 102A, 102B, and 102C, and a port 118B is the inlet to the heat exchanger 116 from the chambers 102A, 102B, and 102C. Similarly, a port 120A is the outlet from the heat exchanger 116 in a direction away from the chambers (e.g., to the ambient), and a port 120B is the inlet to the heat exchanger 116 (e.g., this supplies ambient air, or air from another source). Moreover, a system that draws air from the ambient and returns used air to it as well is sometimes referred to as an open system. By contrast, a closed system can provide for circulation of air within the system.

In passing through the heat exchanger 116, the two air streams are subject to thermal exchange with respect to each other. For example, the incoming air stream (e.g., the one in the path from port 120B to port 118A) can be heated by thermal transfer of energy from the outgoing air stream (e.g., the one in the path from port 118B to port 120A). That is, this can allow for recovery of energy in the return from the oven chambers, rather than losing all of that energy to the ambient, for example.

One or more fans can be used in the oven system to provide a sufficient flow of the air. The fan(s) can be positioned on either of the two sides of the heat exchanger discussed above, or on both sides. For example, the fan(s) can cause air to be conveyed into the heat exchanger 116A on the one side through the inlet port 120B and out through the outlet port 118A; similarly, the fan(s) can cause air to be conveyed into the heat exchanger 116A on the other side through the inlet port 118B and out through the outlet port 120A.

The fact that the oven system has a temperature gradient arrangement along the sequence in which the chambers 102A-102I are positioned can pose a challenge in terms of providing energy recovery in the return from the oven chambers. Namely, the return conduits 112 provide air streams that have a range of temperatures reflecting the temperature gradient arrangement: in this example from about 60° C. to about 100° C. If all these streams were allowed to blend together before the heat exchange, then the operation of the heat exchanger must in a sense be geared toward the lowest temperature of the oven system (in this example 60° C.). As such, the heat exchanger could only partially take advantage of (i.e., recuperate) the energy of the 100° C.-streams, lest the cooler oven chambers be overheated. Stated in a different way, some energy from the hottest air streams could not then be recovered although thermally that energy would be useful in the system (i.e., to maintain the temperature of the hottest ovens).

This disadvantage can be reduced or eliminated by way of a selective grouping of the return air streams based on the temperature gradient arrangement. In some implementations, the individual temperatures of the respective chambers drive the choice of how to do the grouping. For example, manifolds 122 can be used. In some implementations, the return conduits 112A-C are grouped into a manifold 122A, the return conduits 112D-G are grouped into a manifold 122B, and the return conduits 112H-I are grouped into a manifold 122C. For example, this placed air return streams of temperatures in the 60-80° C. range into a common manifold (either 122A or 122C), streams of 100° C. (or a temperature range including that value) into a common manifold separate from the others. Other groupings than the above can be used.

The above example illustrates a benefit of such groupings, namely that the outgoing air from which energy should be recovered is paired with an incoming air stream that is a better fit for it from a temperature perspective. For example, in the case with the return air from the chambers 102A-C, the heat exchanger 116A uses it to heat up air that should initially be no hotter than 60° C. As such, the 60-80° C. return air is suitable for this purpose. The return air from the chambers 102D-G, on the other hand, is now subject to heat exchange with the air that will ultimately be heated to 100° C. As such, heat from the return air is not wasted to the extent it otherwise would; rather, full exchange of heat between incoming and outgoing air can be provided without the disadvantage of heating the incoming air to a too high temperature. Rather, this allows, say, the air headed for the outlet port 118C to be heated to a higher temperature in the heat exchanger 116B than the temperature at which the chamber 102A should be operating. That is, because the chamber 102A is here at 60° C., the air leaving the heat exchanger 116A must therefore be at that temperature, or lower, when it reaches the outlet port 118A.

As such, grouping two or more of the chambers with regard to respective heat exchangers based on the temperature gradient arrangement system can therefore allow the entire oven system to recover more thermal energy and therefore operate more efficiently. The terms group or grouping are here used to refer to one or more components (e.g., one chamber can be a group if it has its own heat exchanger).

The grouping can be done in any of multiple different ways. For example, chambers that should operate at about the same temperature can be grouped with each other, for example such that all 60° C.-chambers belong to one heat exchanger, all 80° C.-chambers are grouped to another heat exchanger, and so on. There can be multiple different such groups for an individual temperature (e.g., two heat exchangers for respective groups of 60° C. chambers). As another example, chambers whose temperature is within a temperature range can be assigned to a corresponding heat exchanger. For example, heat exchangers can be segregated so that one or more of them handle chambers in a 60-80° C. range, whereas at least one other heat exchanger handles chambers in an 80-100° C. range. Such temperatures or temperature ranges can be chosen depending on the particular implementation. For example, the temperature ranges can be evenly spaced throughout the temperature gradient arrangement (e.g., each range covers a 20° C. interval). As another example, one temperature range can be narrower than another lower temperature range (e.g., so that the highest range include only chambers at about 100° C., whereas a lower range is broader.

As such, the oven system 100 is an example of an oven system where heat recovery is based on temperature gradient. Namely, the chambers 102A-I are arranged in a sequence corresponding to the passageway 104, and configured for operating at various temperatures according to a temperature gradient arrangement that spans the sequence. The conveyor belt 108 is configured for transporting the product 106 through the multiple chambers in the sequence, as part of a heat treatment process. The heat treatment is therefore performed in accordance with the temperature gradient arrangement. Multiple heat exchanger systems are also segregated according to temperature. Namely, the heat exchanger 116 have conduits 110 to the respective chambers and return conduits 112 from them. The heat exchanger/chamber pairing, or the grouping of chambers for respective heat exchangers, is based on the chamber's temperature in the temperature gradient arrangement.

The heat exchangers 116 can all be of the same type. In some implementations, however, two or more difference types of heat exchangers can be used. For example, this can provide that a certain type of heat exchanger is used for, say, the hotter air stream(s), while a different type is used for the colder air stream(s).

Figure 2:
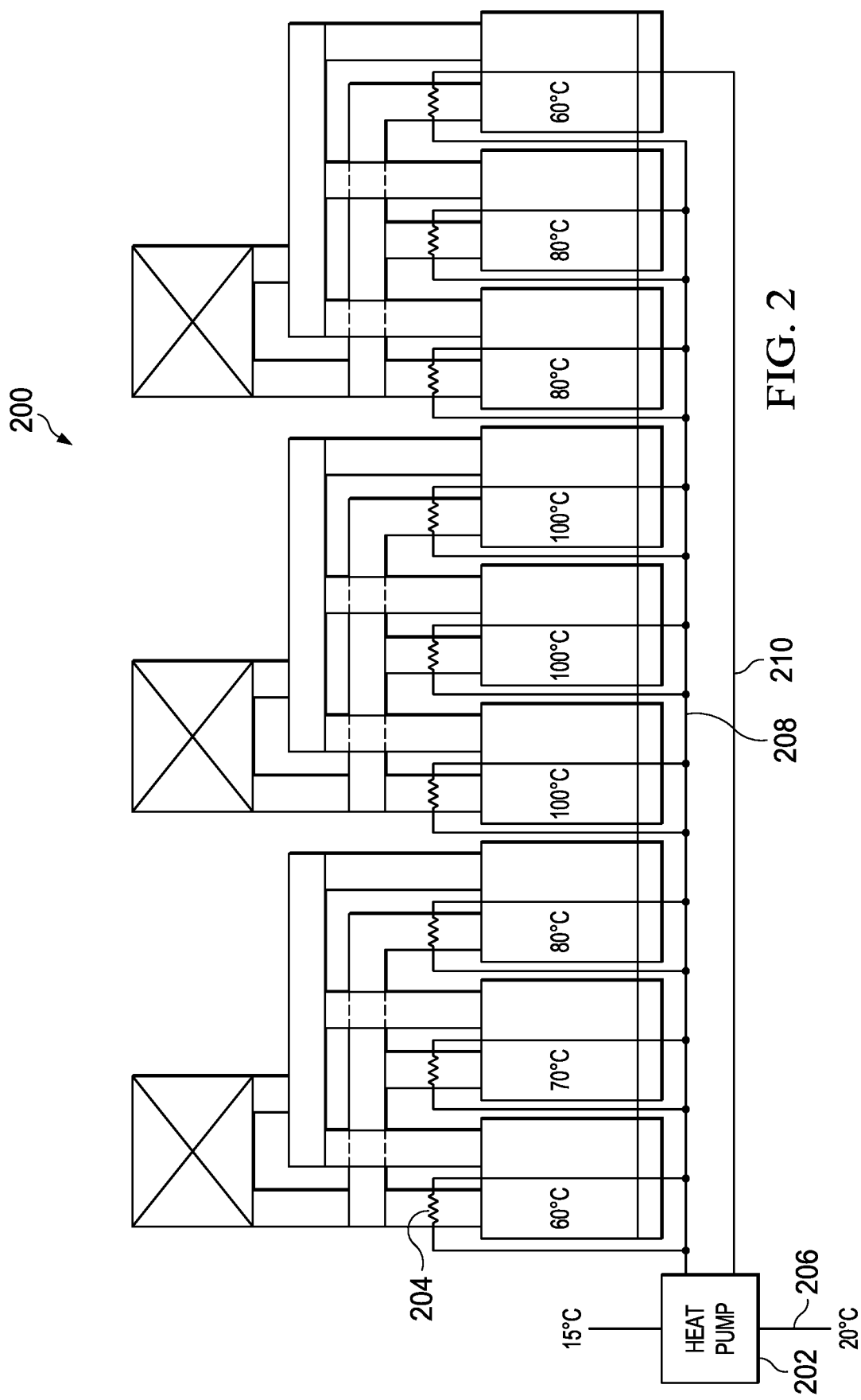
FIG. 2 is a block diagram illustrating another heat-recovering oven system constructed according to one or more embodiments of the present disclosure.

FIG. 2 is a block diagram illustrating another heat-recovering oven system 200 constructed according to one or more embodiments of the present disclosure. Some aspects of this oven system 200 can be similar or identical to those of the oven system 100 described above, except that each of the heat exchanger systems in this example has three chambers grouped thereto, and that chambers may have different temperatures. As such, the oven system 200 is also designed to perform thermal treatment of a material by conveying it through a sequence of oven chambers that are organized in a temperature gradient arrangement.

The oven system 200 here includes a heat pump 202 that is configured for furnishing heat to individual heaters 204 placed in the respective conduits of the heat exchanger systems. The heat pump does so by extracting thermal energy from a heat source, here corresponding to a heat-source inlet 206 (e.g., liquid at 20° C.), delivering that heat into a heat sink, here corresponding to fluid flowing in a heat-sink inlet 208. After the fluid passes through individual ones of the heaters, it can be returned to the heat pump by way of a heat-sink outlet 210. The individual heaters can be regulated to control the resulting chamber temperature, for example so that some chambers are hotter than others. On the other side of the heat pump 202, moreover, a cooler liquid (e.g., at 15° C.) leaves the heat pump 202 through a heat-source outlet after losing some of its energy. As such, the oven system 200 illustrates an example where the respective heaters for chambers that are grouped according to a temperature gradient arrangement are all driven by a common heat pump.

Figure 3:
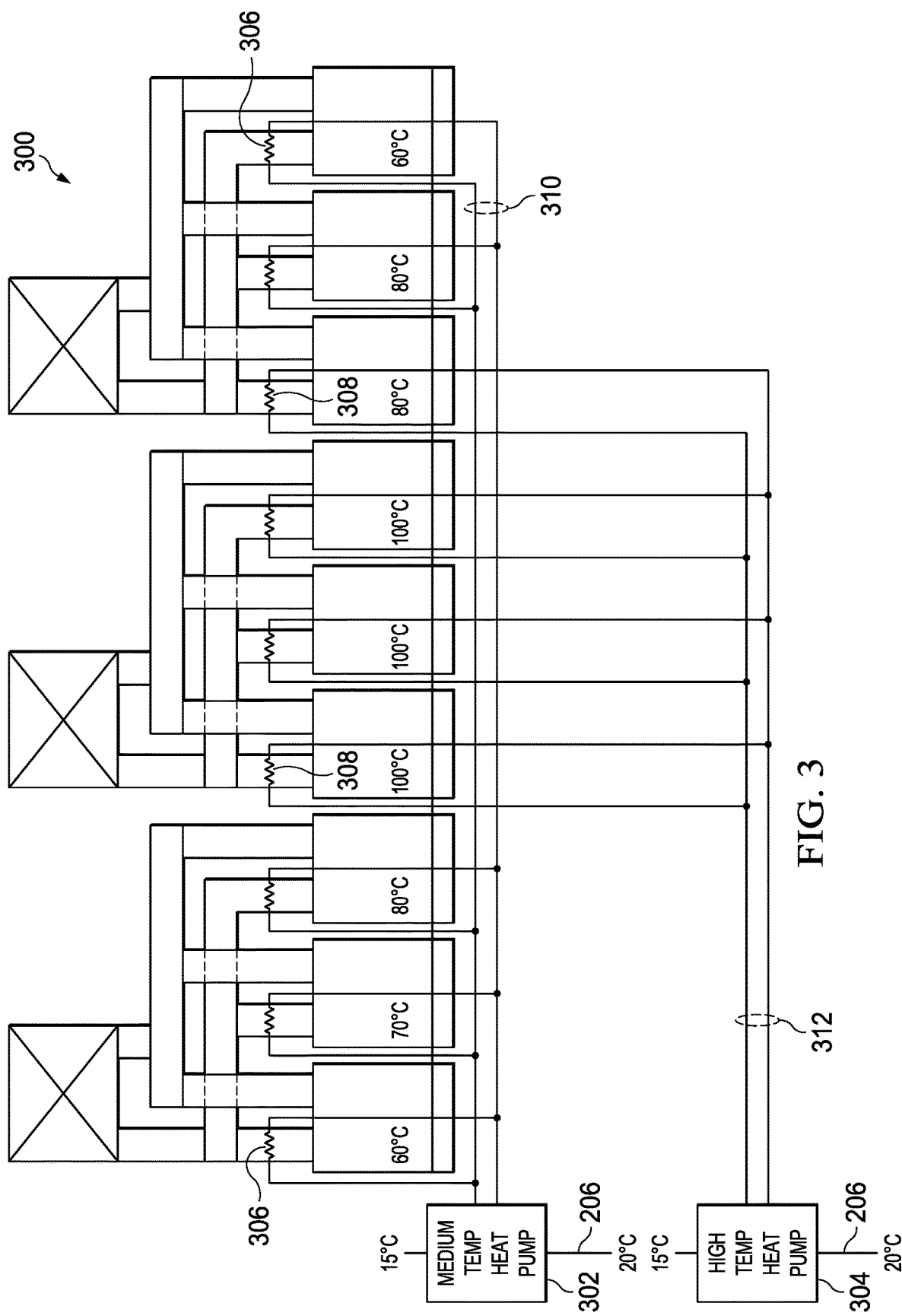
FIG. 3 is a block diagram illustrating another heat-recovering oven system constructed according to one or more embodiments of the present disclosure.

FIG. 3 is a block diagram illustrating another heat-recovering oven system 300 constructed according to one or more embodiments of the present disclosure. Some aspects of this oven system 300 can be similar or identical to those of the oven system 200 described above, except that the oven system 300 uses at least two heat pumps 302 and 304. For example, heat pump 302 can be characterized as a medium temperature heat pump, and heat pump 304 can be characterized as a high temperature heat pump. In some implementations, the heat pumps 302 and 304 are of the same type. In other implementations, however, they can be of different types. For example, this can provide that a certain type of heat pump is used for, say, the hotter chamber(s), while a different type is used for the colder chamber(s).

The heat pumps 302 and 304 can operate based on similar or different heat sources as each other. Here, for example, the heat pumps 302 and 304 are both supplied with 20° C. liquid which is brought down to 15° C. in the respective heat pump. On the heat sink side, moreover, heaters 306 in the conduit for some of the chambers are supplied with heated fluid from the heat pump 302, while heaters 308 for other chambers are supplied with heated fluid from the other heat pump 304. The system can therefore be broken into multiple heat pump loops, here a low temperature loop 310 and a high temperature loop 312. As such, the system 300 is an example where multiple heat pumps are set up to drive a plurality of heaters positioned in conduits leading from heat exchangers to respective chambers of an oven system that has a temperature gradient arrangement, and wherein the heaters are grouped with regard to the heat pumps based on the temperature gradient arrangement.

That is, the present example involves heat exchangers that are segregated with regard to chambers based on temperature, and also heaters that are segregated with regard to heat pumps based on temperature. Moreover, the temperature segregation of the heaters with regard to the heat pumps can be the same as, or different from, the temperature segregation of the chambers with regard to the heat exchangers. For example, all chambers of 60-80° C. temperature are here in the low temperature loop 310, whereas they are grouped under separate heat exchanger systems. On the other hand, all chambers of 100° C. temperature are here in the high temperature loop 312 and are also grouped under the same heat exchanger system.

Figure 4:
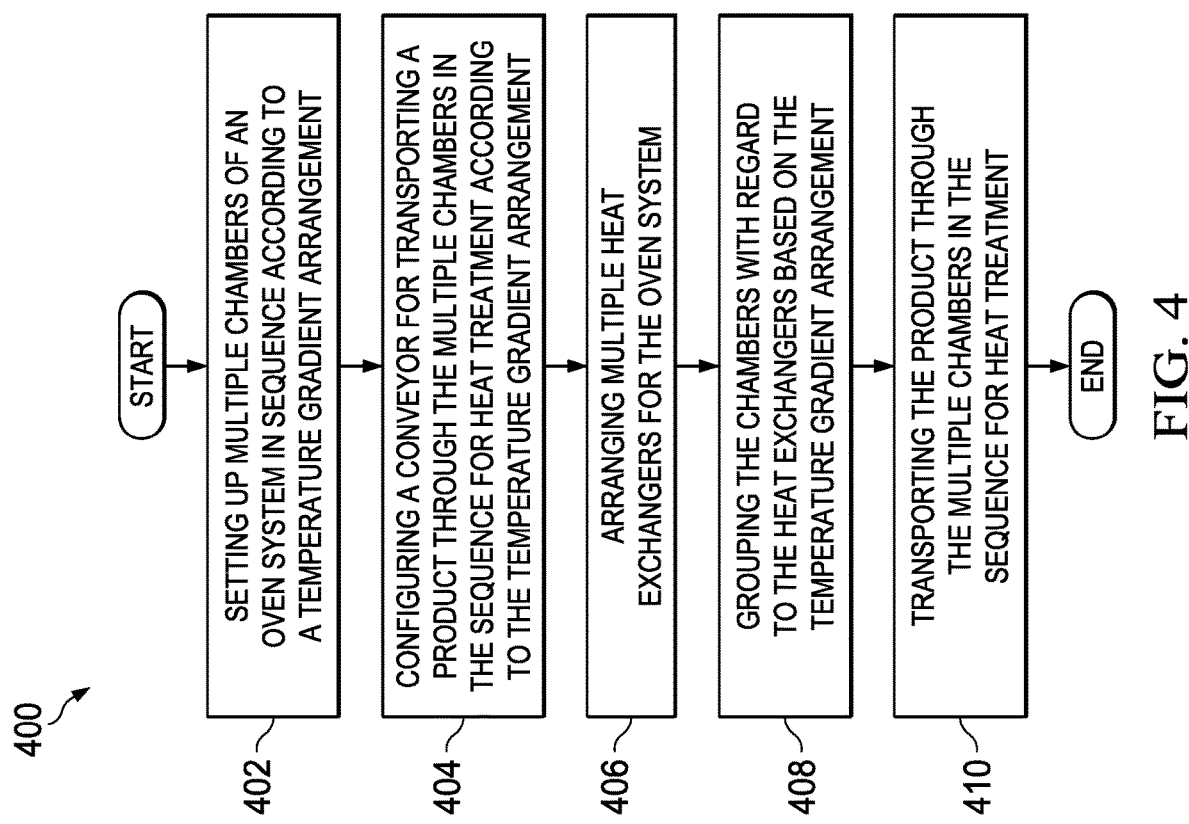
FIG. 4 is a flow chart illustrating a method for recovering heat in an oven system based on temperature gradient according to one or more embodiments of the present disclosure.

FIG. 4 is a flow chart illustrating a method for recovering heat in an oven system based on temperature gradient according to one or more embodiments of the present disclosure. Operations 400 commence with setting up multiple chambers in a sequence according to a temperature gradient arrangement that spans the sequence (step 402). Operations 400 continue with configuring a conveyor for transporting a product through the multiple chambers in the sequence for heat treatment according to the temperature gradient arrangement (step 404). Next, operations 400 includes arranging multiple heat exchangers for the oven system (step 406) and then grouping the chambers with regard to the heat exchangers based on the temperature gradient arrangement (step 408). Operations 400 conclude with transporting the product through the multiple chambers in the sequence for heat treatment (step 410).

The operations 400 of FIG. 4 may further include setting up multiple heat pumps to drive a plurality of heaters positioned in conduits leading from the heat exchangers to the respective chambers and grouping the heaters with regard to the heat pumps based on the temperature gradient arrangement. In such case, a grouping of the heaters may be different from the grouping of the chambers.

Further, the temperature gradient arrangement may include increasing temperatures from a beginning of the sequence, and decreasing temperatures toward an end of the sequence. The method may further include operating the heat-recovering oven system as an open system so that at least some of the heat exchangers receive ambient air. The method may also include assigning heat exchangers to chambers based upon temperature ranges. In such case, the temperature ranges may be evenly spaced throughout the temperature gradient arrangement. In other cases, the temperature ranges may not be evenly spaced.

In the foregoing specification, the invention has been described with reference to specific embodiments. However, as one skilled in the art will appreciate, various embodiments disclosed herein can be modified or otherwise implemented in various other ways without departing from the spirit and scope of the invention. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Control of the ovens described herein may be implemented through electronics, e.g., one or more processors, using software and firmware instructions. A "processor" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A heat-recovering oven system based on temperature gradient, the heat-recovering oven system comprising:
    multiple chambers arranged in a sequence, the multiple chambers configured for operating at various temperatures according to a temperature gradient arrangement that spans the sequence, wherein each chamber of the multiple chambers includes a cavity defined by walls, wherein each chamber of the multiple chambers further includes an entry and exit opening to pass material through the heat-recovering oven system;
    a conveyor configured for transporting product through the multiple chambers in the sequence for heat treatment according to the temperature gradient arrangement; and
    multiple temperature-segregated heat exchanger systems, the temperature-segregated heat exchanger systems being of different types, each temperature-segregated heat exchanger system including a heat exchanger, a conduit to a plurality of chambers of the multiple chambers based on the temperature of the plurality of chambers in the temperature gradient arrangement, and a return conduit from the a plurality of the chambers of the multiple chambers to the heat exchanger.

2. The heat-recovering oven system of claim 1, wherein the temperature gradient arrangement comprises increasing temperatures from a beginning of the sequence, and decreasing temperatures toward an end of the sequence.

3. The heat-recovering oven system of claim 1, wherein the heat-recovering oven system is open so that at least some of the temperature-segregated heat exchangers receive ambient air.

4. The heat-recovering oven system of claim 1, wherein each of the temperature-segregated heat exchanger systems is configured so that any one of the chambers whose temperature is within a temperature range predefined for that temperature-segregated heat exchanger system is assigned to a corresponding heat exchanger.

5. The heat-recovering oven system of claim 4, wherein the temperature range is evenly spaced throughout the temperature gradient arrangement.

6. The heat-recovering oven system of claim 4, wherein a higher temperature range is narrower than at least one other lower temperature range.

7. The heat-recovering oven system of claim 1, wherein each of the temperature-segregated heat exchanger systems further includes a heater in the conduit.

8. The heat-recovering oven system of claim 7, further comprising a heat pump, wherein heaters of each of the temperature-segregated exchanger systems are driven by the heat pump.

9. The heat-recovering oven system of claim 7, further comprising multiple heat pumps, wherein heaters of some of the temperature-segregated exchanger systems are driven a first heat pump and heaters of other of the temperature-segregated exchanger systems are driven by a second heat pump.

10. The heat-recovering oven system of claim 9, wherein a temperature segregation of the heaters with regard to corresponding heat pumps is different from a temperature segregation of the chambers with regard to the temperature-segregated heat exchangers.

11. The heat-recovering oven system of claim 9, wherein the multiple heat pumps are of different types depending on the temperature gradient arrangement.

12. The heat-recovering oven system of claim 1, wherein:
a first heat exchanger is included in a first temperature-segregated heat exchanger system;
a second heat exchanger is included in a second temperature-segregated exchanger system;
ambient incoming air incoming to the first heat exchanger is heated to a higher temperature than is ambient air incoming to the second heat exchanger.

13. The heat-recovering oven system of claim 1, wherein the different types depend on the temperature gradient arrangement.

14. A method of recovering heat in an oven system based on temperature gradient, the method comprising:
setting up multiple chambers in a sequence according to a temperature gradient arrangement that spans the sequence, wherein a conveyor is configured for transporting product through the multiple chambers in the sequence for heat treatment according to the temperature gradient arrangement, wherein each chamber of the multiple chambers is configured to provide a cavity, wherein each chamber of the multiple chambers is further configured with an entry and exit opening to pass the product through the heat-recovering oven system;
arranging multiple heat exchangers for the oven system, the heat exchangers being of different types; and
grouping the chambers with regard to the heat exchangers based on the temperature gradient arrangement, wherein each heat exchanger is configured to provide a conduit to a grouping of chambers and a return conduit from the grouping of chambers and each heat exchanger is associated with a plurality of chambers of the multiple chambers.

15. The method of claim 14, further comprising:
setting up multiple heat pumps to drive a plurality of heaters positioned in conduits leading from the heat exchangers to the respective chambers; and
grouping the heaters with regard to the heat pumps based on the temperature gradient arrangement.

16. The method of claim 14, wherein a grouping of the heaters is different from the grouping of the chambers.

17. The method of claim 14, wherein the temperature gradient arrangement comprises increasing temperatures from a beginning of the sequence, and decreasing temperatures toward an end of the sequence.

18. The method of claim 14, further comprising operating the oven system as an open system so that at least some of the heat exchangers receive ambient air.

19. The method of claim 14, further comprising assigning heat exchangers to chambers based upon temperature ranges.

20. The method of claim 19, wherein the temperature ranges are evenly spaced throughout the temperature gradient arrangement.

* * * * *